Figure 1:
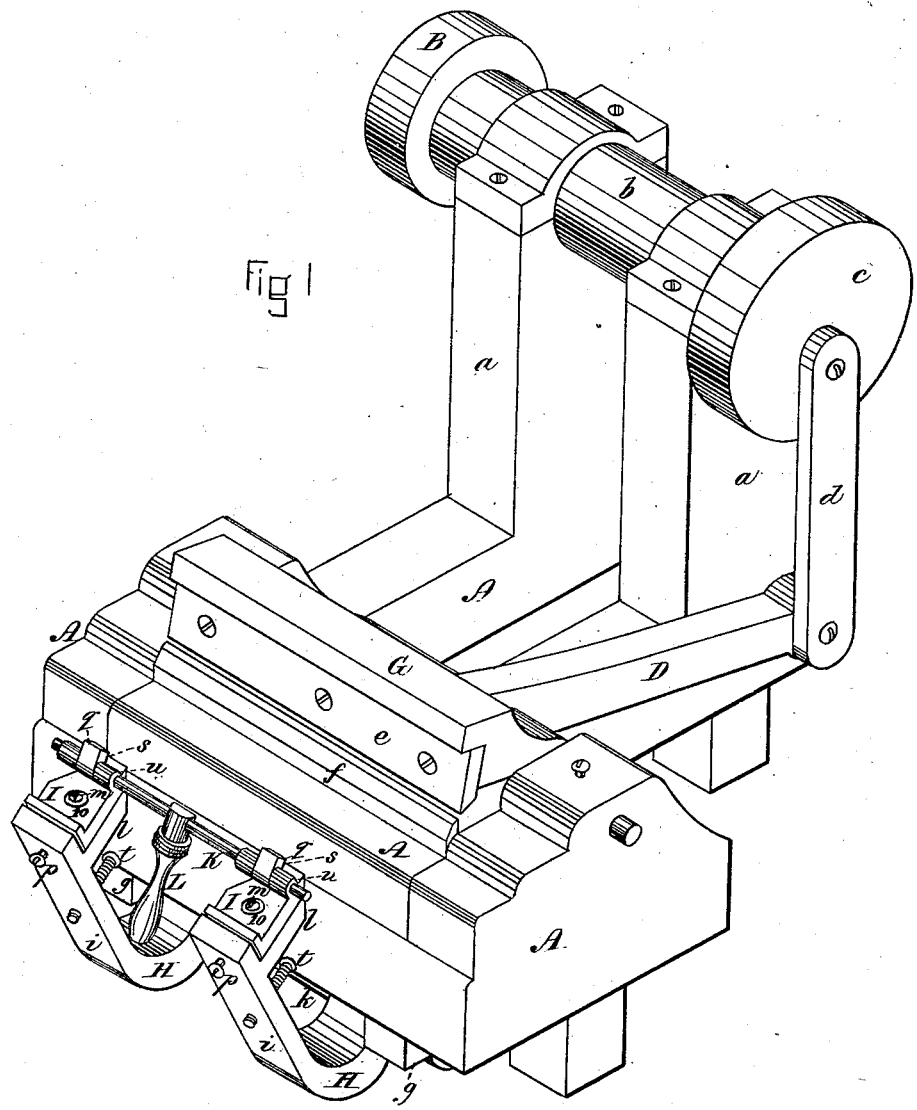

(No Model.) 2 Sheets—Sheet 1.
H. R. PACKARD & W. H. WILBER.
MACHINE FOR CUTTING NAIL, TACK, AND RIVET PLATES.
No. 277,923. Patented May 22, 1883.

WITNESSES
W. J. Cambridge
Geo. W. Page

INVENTORS
Henry R. Packard
William H. Wilber
per P. E. Teschemacher
Atty (No Model.)
H. R. PACKARD & W. H. WILBER.
MACHINE FOR CUTTING NAIL, TACK, AND RIVET PLATES.
No. 277,923. Patented May 22, 1883.
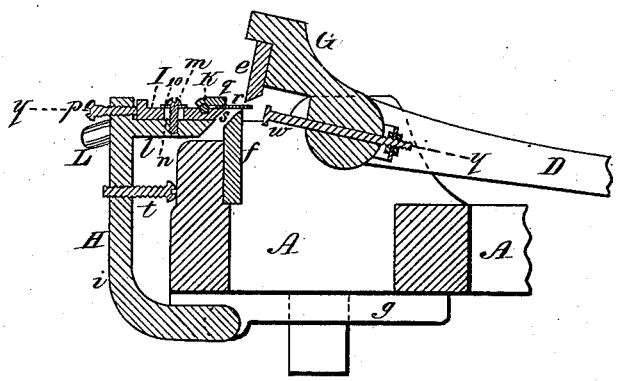
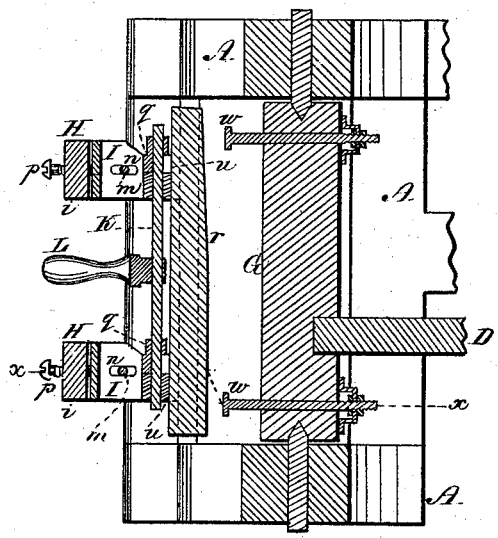
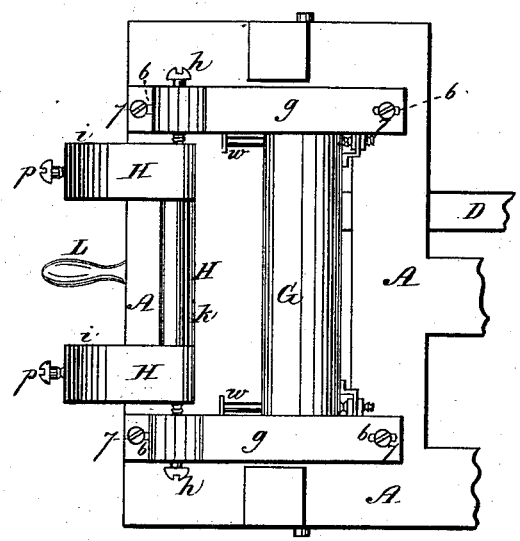
WITNESSES
W. J. Cambridge
Geo. W. Page
INVENTORS
Henry R. Packard
William H. Wilber
per P. E. Teschemacher
Atty

UNITED STATES PATENT OFFICE.

HENRY R. PACKARD AND WILLIAM H. WILBER, OF TAUNTON, MASSACHUSETTS, ASSIGNORS OF ONE-THIRD TO THE ALBERT FIELD TACK COMPANY, OF SAME PLACE.

MACHINE FOR CUTTING NAIL, TACK, AND RIVET PLATES.

SPECIFICATION forming part of Letters Patent No. 277,923, dated May 22, 1883.

Application filed August 9, 1882. (No model.)

*To all whom it may concern:*

Be it known that we, HENRY R. PACKARD and WILLIAM H. WILBER, citizens of the United States, residing at Taunton, in the county of Bristol and State of Massachusetts, have invented certain Improvements in Machines for Cutting Nail, Tack, and Rivet Plates, of which the following is a full, clear, and exact description, reference being had to the accompanying drawings, making part of this specification, in which—

Figure 1 is a perspective view of our improved machine. Fig. 2 is a vertical section on the line $x$ $x$ of Fig. 3, the movable frame being thrown forward. Fig. 3 is a horizontal section on the line $y$ $y$ of Fig. 2. Fig. 4 is a plan of a portion of the under side of the machine.

In machines for "chopping" or cutting sheet metal into tack and nail plates, as heretofore constructed, it has been customary, after making the last cut, to place aside the last piece, which is generally of unequal width and too narrow to admit of its being held by the hand-nippers for another cut, and when a sufficient number of these pieces have been accumulated they have been trimmed to the required width in an ordinary slitting-machine. This latter operation is, however, slow and tedious, as the strip has to be fed into the machine endwise, while the shears or cutters make a series of short cuts from one end to the other of the strip.

Our invention has for its object to facilitate the operation of cutting or trimming these last pieces, thus effecting a material saving in time and labor; and it consists in attaching to a plate-cutting machine a movable frame, which is arranged in front of the cutters and carries a clamping or gripping device for holding the last piece of plate in a reversed position and presenting it to the cutters, so that a strip of the required width can be cut therefrom, this movable frame being provided with one or more stops or gages for the edge of the metal strip to rest against, made adjustable in order to insure the edge of the strip or plate in contact therewith being always parallel with the bed-cutter of the machine, the position of which is liable to become changed from inaccuracies in grinding or other causes, an adjustable stop or stops being also provided for regulating or controlling the advance of the movable frame, in order to determine the width of the strip to be cut; and our invention also consists in certain details of construction, as hereinafter set forth and specifically claimed.

In the said drawings, A represents the frame-work of the machine, from the rear of which rise two standards, $a$ $a$, in bearings, at the top of which runs the driving-shaft $b$, which carries at one end a pulley, B, and at the opposite end a disk, $c$, provided with a crank-pin, to which is secured the upper end of a pitman, $d$, the lower end of which is pivoted to a long arm, D, projecting from the upper cutter-lever, G, which is pivoted between the side pieces of the frame A and carries the upper cutter, $e$, the lower or bed cutter, $f$, being secured to the front side of the frame A.

Between two pieces, $g$ $g$, secured to the bottom of the frame-work A and made adjustable thereon by means of slots and screws 6 7, is pivoted, on screws $h$, a frame, H, composed of two side pieces, $i$ $i$, connected together at the bottom by a bar, $k$, the frame being thus adapted to be swung on its pivots toward and away from the front of the machine. At the upper end of each piece $i$, on its inner side, is a projection, $l$, upon the upper flat surface of which is secured by means of a screw, $m$, passing through a washer, 10, and slot $n$, an adjustable plate, I, which can be moved in the direction of its length by means of a screw, $p$, which passes through the top of the piece $i$ and bears against the adjacent end of the plate I. In bearings at the inner ends of these plates I are secured the opposite ends of a horizontal rock-shaft, K, to which are secured the movable jaws $q$ $q$ of the clamping or gripping device, by which the last piece $r$ of the metal plate is held while being acted upon by the cutters $e$ $f$, the lower or stationary jaws, $s$, of the gripping device being formed by the portions of the plates I I, immediately beneath the jaws $q$ $q$.

To the shaft $k$, at or near its center, is secured a lever, or handle, L, by raising which the jaws $q\ q$ are brought down upon the metal plate $r$ to hold it, and by lifting the handle still farther the frame H is swung up on its pivots toward the front of the machine in order to carry forward to the cutters the plate to be cut or trimmed, each side piece, $i$, being provided with a screw, $t$, forming an adjustable stop, which is brought into contact with the front of the machine, as seen in Fig. 2, and thus serves to regulate or control the advance of the movable frame H in order to determine the width of the strip to be cut from the piece of metal $r$, held between the jaws $q\ s$, the adjustability of these stops enabling the strip to be cut of the greatest possible width that the piece of metal will admit of.

At the end of each plate I, nearest the cutters, is a shoulder, $u$, which forms a gage for the edge of the metal plate to be cut to rest against, these shoulders or gages being in line with the jaws of the gripping device, and by making the plates I movable, as above described, the gages $u$ thereon can be so adjusted that the straight edge of the metal plate in contact therewith will be always parallel with the edge of the bed-cutter $f$, as required, to produce perfect work, this capability of adjustment being essential, as the position of the edge of the cutter $f$ is liable to vary, owing to inaccuracies in grinding or from other causes.

When a number of strips of metal have been collected together, each of which is the last piece of a sheet previously cut into tack or nail plates, and placed aside on account of being too narrow to allow of being held by the hand-nippers for another cut, the operator takes in one hand several of these "last pieces" and places them, one at a time, between the jaws of the gripping device in a reversed position or with the square-cut edge against the gages $u$, and with the other hand raises the handle L, which causes the strip or plate to be clamped or gripped by the jaws $q\ s$, when, by lifting the handle L still farther, he raises the frame H and moves it forward until arrested by the contact of the stops $t$ with the front of the frame A, this forward movement of the frame carrying the plate or strip $r$ between the cutters $e\ f$, as seen in Fig. 2, when the upper cutter is brought down to trim the strip to the required width. The operator is thus enabled to clamp the plate and move it forward to the cutters with one hand and without removing this hand from the handle L, thus leaving his other hand free to hold a number of plates or strips and properly place them in position between the jaws of the clamping device, and enabling him to work with rapidity and to great advantage, whereby a considerable saving in time and labor is effected.

The movable frame H may be detached from the machine or dropped down out of the way when desired, and the machine can then be used for cutting strips from plates in the ordinary manner for use as nail, tack, or rivet plates, in which case the gages $w$ in the rear of the cutters $e\ f$ will be employed, as usual, for the edge of the plate being cut to strike against, these gages $w$ being moved back out of the way, as seen in Figs. 2 and 3, when the frame H is being used and the last pieces are being trimmed.

We are aware of the United States Patent of L. Soule, dated September 5, 1876, No. 181,993, in which a holder is employed for holding the last piece of the plate to be cut; but the construction of this holder differs essentially from that above described, as it is entirely separate from the machine, and requires to be held up to the same by hand and supported upon rests projecting from the same, while it is not provided with adjustable plates forming gages, as is the case with our holder. Furthermore, in the above-named patent of L. Soule, graded stops are secured to the machine, against which gage-screws on the holder are brought into contact, which necessitates a lateral movement of the holder by the hands of the operator; and in the Soule machine both hands of the operator are required to hold the plate-holder up to its work, while with our machine one hand only is required, leaving the other hand free to handle the plate. We therefore lay no claim to the construction or to any of the devices shown in the aforesaid patent of L. Soule; but

What we claim as our invention, and desire to secure by Letters Patent, is—

1. In a nail-plate-cutting machine, the combination, with the cutters, of the movable frame H, with its downwardly-extending side pieces, $i\ i$, pivoted at $h\ h$ to the frame A, and arranged in front of the cutters, and provided with a plate clamping or holding device and an adjustable stop or stops, $t$, for controlling its advance, all constructed to operate substantially in the manner and for the purpose described.

2. In a nail-plate-cutting machine, the combination, with the cutters, of the movable frame H, attached to the machine and arranged in front of the cutters, the adjustable plates I I, secured to the frame H, a plate clamping or holding device operating in connection therewith, and an adjustable stop or stops, $t$, for controlling the advance of the movable frame H, all constructed to operate substantially in the manner and for the purpose set forth.

3. In a nail-plate-cutting machine, the combination, with the movable frame H, attached to the machine, of the plates I I, provided with shoulders or gages $u\ u$, and made adjustable upon said frame, and the gripping-jaws $q\ q$ for holding the plate or strip of metal to be cut, all constructed to operate substantially in the manner and for the purpose described.

4. In a nail-plate-cutting machine, the combination, with the movable frame H and the plates I I, secured thereto, of the gripping-jaws q q, attached to the horizontal rock-shaft K, provided with an operating-handle, L, so constructed and arranged that after the jaws q q have been brought down upon the plate or strip of metal to be cut a continued upward pressure of the handle will serve to move the frame H and carry it forward to present the plate or strip of metal to the cutters, substantially as described.

Witness our hands this 3d day of August, A. D. 1882.

HENRY R. PACKARD.
    WILLIAM H. WILBER.

In presence of—
 HERBERT E. HALL,
 G. E. MANNING.